(12) United States Patent
Verma et al.

(10) Patent No.: US 12,540,576 B1
(45) Date of Patent: Feb. 3, 2026

(54) INNER STRUCTURE DIFFUSER/OUTLET GUIDE VANE ASSEMBLIES FOR GAS TURBINE ENGINES

(71) Applicant: General Electric Company, Evendale, OH (US)

(72) Inventors: Ajay Kumar Verma, Bengaluru (IN); Jeremy K. Payne, Cincinnati, OH (US); Adam Robert Kahn, Mason, OH (US); Trevor James Hahm, Cincinnati, OH (US); Veera Venkata Amarnath Manem, Bengaluru (IN); Mohan Hanumappa Reddy, Bengaluru (IN); Mark Brown, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/897,412

(22) Filed: Sep. 26, 2024

(51) Int. Cl.
*F01D 25/24* (2006.01)
*F02C 3/14* (2006.01)
*F02C 7/18* (2006.01)

(52) U.S. Cl.
CPC ............... *F02C 7/18* (2013.01); *F01D 25/24* (2013.01); *F02C 3/14* (2013.01)

(58) Field of Classification Search
CPC ... F01D 9/02; F01D 9/04; F01D 25/24; F05D 2240/12; F05D 2240/90; F05D 2240/91; F05D 2260/30; F05D 2260/941; F23R 3/10; F23R 3/60; F23R 2900/00017
See application file for complete search history.

(56) References Cited

U.S. PATENT DOCUMENTS

| 3,780,529 | A | * | 12/1973 | Johnson | F23R 3/60 60/804 |
|---|---|---|---|---|---|
| 5,249,921 | A | | 10/1993 | Steuber et al. | |
| 6,554,569 | B2 | | 4/2003 | Decker et al. | |
| 7,409,831 | B2 | * | 8/2008 | Lepretre | F01D 25/24 60/785 |
| 8,561,410 | B2 | | 10/2013 | Mulclaire | |
| 9,574,575 | B2 | | 2/2017 | Graves et al. | |
| 10,161,414 | B2 | | 12/2018 | Eastwood et al. | |
| 11,015,468 | B2 | | 5/2021 | Zaccardi et al. | |
| 11,994,041 | B2 | | 5/2024 | Johnson et al. | |

FOREIGN PATENT DOCUMENTS

| CN | 110726562 B | 10/2020 |
|---|---|---|
| FR | 3078097 A1 | 8/2019 |

* cited by examiner

*Primary Examiner* — Devon C Kramer
*Assistant Examiner* — Sean V Meiller
(74) *Attorney, Agent, or Firm* — Hanley, Flight & Zimmerman, LLC

(57) ABSTRACT

Inner structure diffuser/OGV assemblies for gas turbine engines are disclosed herein. A gas turbine engine includes a compressor section, a combustion section, and a turbine section in a serial flow arrangement. The combustion section includes an outer casing and an inner structure assembly coupled to the outer casing. The inner structure assembly includes an outer radial support arm, an inner radial support arm, and a diffuser coupled between the outer radial support arm and the inner radial support arm. The outer radial support arm extends at least partially in an axially downstream direction from the diffuser, and the inner radial support arm extends at least partially in the axially downstream direction from the diffuser. The outer radial support arm defines an opening therethrough.

16 Claims, 4 Drawing Sheets

INNER STRUCTURE DIFFUSER/OUTLET GUIDE VANE ASSEMBLIES FOR GAS TURBINE ENGINES

FIELD OF THE DISCLOSURE

This disclosure relates generally to gas turbine engines and, more particularly, to inner structure diffuser/outlet guide vane (OGV) assemblies for gas turbine engines.

BACKGROUND

Gas turbine engines are some of the most widely-used power generating technologies. Gas turbine engines are an example of an internal combustion engine that uses a burning air-fuel mixture to produce hot gases that spin a turbine to generate power. Applications of gas turbine engines can be found in aircraft, trains, ships, electrical generators, gas compressors, and pumps. For example, modern aircraft rely on a variety of gas turbine engines as part of a propulsion system to generate thrust, including a turbojet, a turbofan, a turboprop, and an afterburning turbojet.

Gas turbine engines typically include a compressor section, a combustion section, and a turbine section, in a serial flow arrangement. The combustion section includes a combustor that defines a combustion chamber where the air and fuel are mixed and ignited to produce hot gases. The outlet of the combustor is connected to the inlet of the turbine section. Some combustion sections include a diffuser to decelerate and/or otherwise condition the flow of air from the compressor section into the combustor.

BRIEF DESCRIPTION OF THE DRAWINGS

The figures are not to scale. Instead, the thickness of regions may be enlarged in the drawings. In general, the same reference numbers will be used throughout the drawing(s) and accompanying written description to refer to the same or like parts.

DETAILED DESCRIPTION

Figure 1:
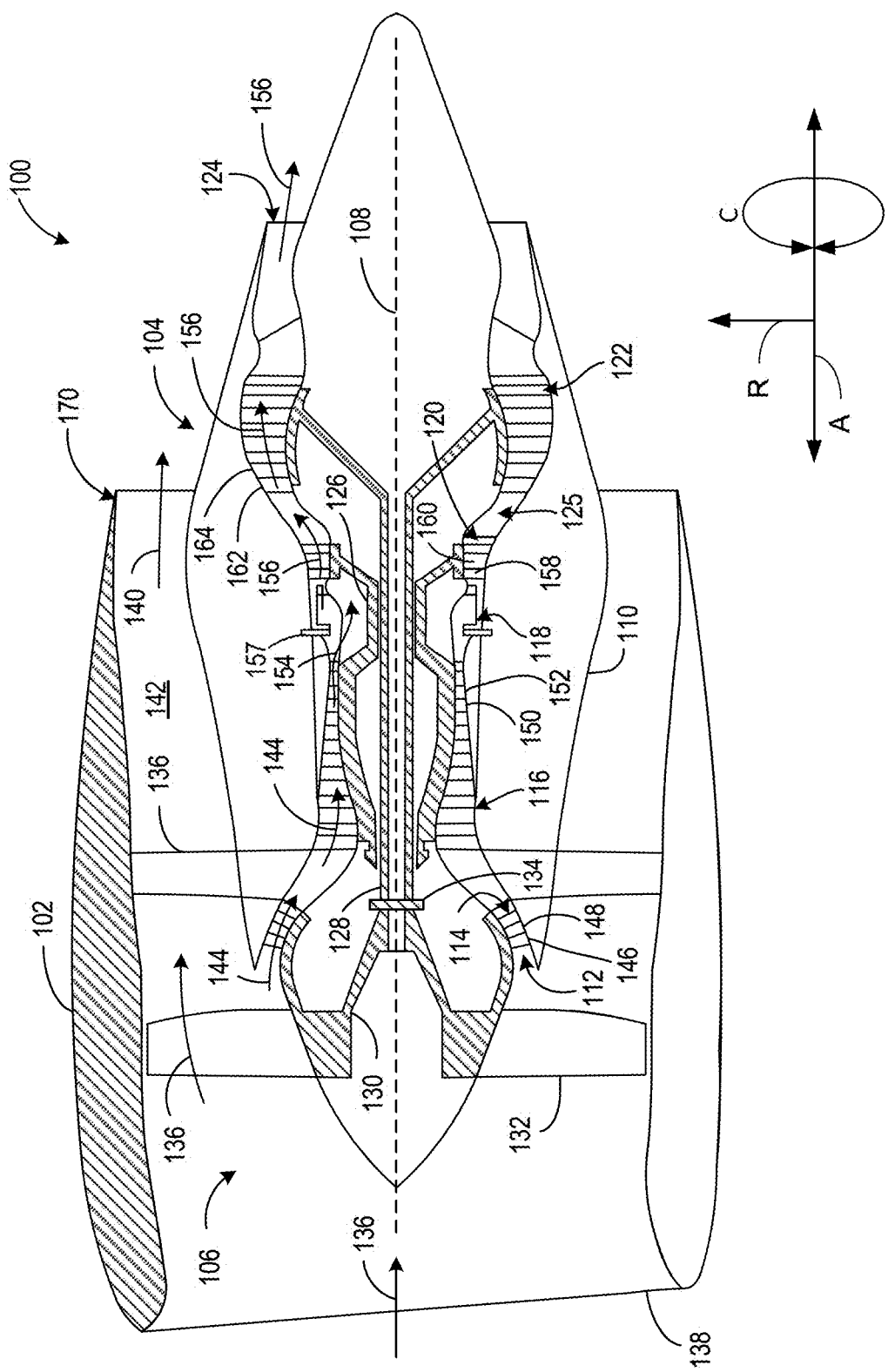
FIG. 1 is a schematic cross-sectional view of an example turbo engine including an example gas turbine engine in which examples disclosed herein can be implemented.

Reference now will be made in detail to examples or embodiments of the presently described technology, one or more examples of which are illustrated in the drawings. Each example or embodiment is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one example or embodiment can be used with another example or embodiment to yield a still further example or embodiment. Thus, it is intended that the presently described technology covers such modifications and variations as come within the scope of the appended claims and their equivalents.

Turbo engines (e.g., turbofan engines, turboprop engines, etc.), such as those used on aircraft, include a gas turbine engine having a compressor section, a combustion section, and a turbine section in a serial flow arrangement. The combustion section includes a combustor that defines a combustion chamber where air and fuel are mixed and ignited to produce hot combustion gases. The outlet of the combustor is aligned axially and radially with an inlet of the turbine section to create a continuous hot gas flow path that directs the hot combustion gases from the combustor into the stage one nozzle of the turbine section. In some engines, a sealing mechanism is disposed at the interface between the combustion liners and the inner and outer bands of the stage one nozzle to prevent excess purge and leakage airflow from entering the hot gas flow path. Some combustion sections include an inner structure assembly, which includes a diffuser and OGVs that direct air from the compressor section toward the combustor. The inner structure assembly includes an outer radial support arm that couples the diffuser/OGVs to an outer casing of the combustion section, and an inner radial support arm that extends between the diffuser/OGVs and the inner nozzle support to hold the inner band of the stage one nozzle. The outer casing and the inner structure assembly in conjunction with the inner nozzle support define a volume around the combustor chamber. Some known inner structure assemblies have a straight line of action between the outer and inner radial support arms. In other words, the outer radial support arm is generally aligned or angled along the same plane as the inner radial support arm. However, this arrangement of the outer and inner radial support arms can result in higher axial displacements at the inner nozzle support due to thermal expansion in the rearward direction. The increased axial motion of the nozzle support can thus lead to an increased gap between the combustor liners and the stage one nozzle because the position of the stage one nozzle in the engine is set by the inner nozzle support. This can lead to undesirable leakage flows between the components, which reduces overall engine efficiency, and/or potential hot gas ingestion that can reduce component durability. Further, this configuration requires a larger axial space and therefore limits the amount that the engine can be shortened. Other example inner structure assemblies have a swept cone shape configuration in which both the outer and inner radial support arms extend generally aft or downstream of the diffuser/OGV. This shape or configuration results in comparatively lower axial displacements at the nozzle support due to thermal expansion of the outer and inner radial support arms in opposing directions axially. This lower displacement of the nozzle support thus reduces relative motion of the combustor to the stage one nozzle and, thus, reduces the size of the gaps that could lead to flow leakage and/or hot gas ingestion.

Disclosed herein is an example inner structure assembly having a swept cone shape configuration with openings in the outer radial support arm to enable one or more hardware components to extend through the outer radial support arm. For example, an example gas turbine engine disclosed herein can include a cooled cooling air (CCA) system that produces cooling air that can be used to cool to one or more components of the engine (e.g., the stage one high-pressure turbine rotor blades). The cooling air is conditioned outside of the main flow path of the gas turbine engine. In some examples, one or more CCA pipes of the CCA system are routed through the openings in the outer radial support arm of the inner structure assembly. As such, the openings in the outer radial support arm enable the CCA pipes to route the cooling air back into or through the main flow path and to the appropriate downstream components, such as the turbine rotor blades. Therefore, the example inner structure assembly enables the use of a swept cone configuration, which is beneficial to reduce deflection and allow shorter engine length, while enabling the CCA pipes to extend radially into the main flow path. Further, in some examples, one or more forward mounting arms can be coupled to the combustor and extend through the openings and coupled to the outer casing. The use of forward mounting arms helps to better support the combustor liners and bulkhead and reduces potential relative motion between the fuel nozzles and swirler components of the combustor due to the close proximity of the mount location relative to the fuel nozzle flange. As such, the openings enable accessibility for one or more radially extending hardware components. This results in a more compact arrangement of the parts, which is often desired for smaller or shorter engines. Also, the openings also reduce the overall weight of the inner structure assembly, which increases efficiency of the engine.

The terms "upstream" and "downstream" refer to a relative location or direction with respect to fluid flow between an upstream location or source of fluid and a downstream location or end location of the fluid. For example, "upstream" refers to a location that is relatively closer to or in a direction that is toward the upstream location or source of fluid, whereas "downstream" refers to a location that is relatively closer to or in a direction toward the downstream location or end location of the fluid.

As used herein, the terms "axial" and "longitudinal" both refer to a direction parallel to the centerline axis of a gas turbine engine (e.g., a turboprop, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to a relative location or direction along a radial line from the outer circumference of the gas turbine engine towards the centerline axis of the gas turbine engine, and "radially outward" refers to a relative location or direction along a radial line from the centerline axis of the gas turbine engine towards the outer circumference of the gas turbine engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/ or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Referring now to the drawings, FIG. 1 is a schematic cross-sectional view of an example turbo engine 100 that can incorporate various examples disclosed herein. The example turbo engine 100 can be implemented on an aircraft and therefore referred to as an aircraft engine. In this example, the turbo engine 100 is a turbofan-type of engine. However, the principles of the present disclosure are also applicable to other types of engines, such as turboprop engines and engines without a nacelle, such as unducted fan (UDF) engines (sometimes referred to as propfans). Further, the example principles disclosed herein can be implemented on other types of engines, such as power-generation engines.

As shown in FIG. 1, the turbo engine 100 includes an outer bypass duct 102 (which may also be referred to as a nacelle, fan duct, or outer casing), a gas turbine engine 104, and a fan section 106. The gas turbine engine 104 and the fan section 106 are disposed at least partially in the outer bypass duct 102. The gas turbine engine 104 is disposed downstream from the fan section 106 and drives the fan section 106 to produce forward thrust.

As shown in FIG. 1, the turbo engine 100 and/or the gas turbine engine 104 define a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the turbo engine 100, such as to the left in FIG. 1, while the terms "rearward" or "aft" refer to a direction along the centerline axis 108 in the opposite direction, such as to the right in FIG. 1.

The gas turbine engine 104 includes a substantially tubular outer casing 110 (which may also be referred to as a mid-casing) that defines an annular inlet 112. The outer casing 110 of the gas turbine engine 104 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118, a turbine section having a high pressure turbine 120 ("HP turbine 120") and a low pressure turbine 122 ("LP turbine 122"), and an exhaust section 124. A flow path 125 (e.g., an air flow path) extends from the annular inlet 112 to exhaust section 124 such that compressors 114, 116, combustion section 118, the turbines 120, 122, and the exhaust section 124 are in fluid communication.

The gas turbine engine 104 includes a high pressure shaft 126 ("HP shaft 126") that drivingly couples the HP turbine 120 and the HP compressor 116. The gas turbine engine 104 also includes a low pressure shaft 128 ("LP shaft 128") that drivingly couples the LP turbine 122 and the LP compressor 114. The LP shaft 128 also couples to a fan shaft 130. The fan section 106 includes a plurality of fan blades 132 that are coupled to and extend radially outward from the fan shaft 130. In some examples, the LP shaft 128 may couple directly to the fan shaft 130 (i.e., a direct-drive configuration). In alternative configurations, the LP shaft 128 may couple to the fan shaft 130 via a reduction gear 134 (e.g., an indirect-drive or geared-drive configuration). While in this example the gas turbine engine 104 includes two compressors and two turbines, in other examples, the gas turbine engine 104 may only include one compressor and one turbine. Further, in other examples, the gas turbine engine 104 can include more than two compressors and turbines. In such examples, the gas turbine engine 104 may include more than two drive shafts or spools.

As illustrated in FIG. 1, during operation of the turbo engine 100, air 136 enters an inlet 138 of the outer bypass duct 102. The air 136 is accelerated by the fan blades 132 (sometimes considered a low-pressure compressor). A first portion 140 of the air 136 flows into a bypass airflow passage 142 (defined between the outer bypass duct 102 and the gas turbine engine 104), while a second portion 144 of the air 136 flows into the annular inlet 112 of the gas turbine engine 104 and to the LP compressor 114. One or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor blades 152 coupled to the HP shaft 126 further compress the second portion 144 of the air 136 flowing through the HP compressor 116. This provides compressed air 154 to the combustion section 118 where the compressed air 154 mixes with fuel and burns to produce combustion gases 156. Fuel is injected into the combustion section 118 by one or more fuel nozzles 157.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. The HP turbine rotor blades 160 rotates the HP shaft 126, which rotates the HP compressor rotor blades 152 and therefore supports operation of the HP compressor 116. The combustion gases 156 flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the gas turbine engine 104 through the exhaust section 124 thereof. The combustion gases 156 mix with the first portion 140 of the air 136 exiting an exhaust nozzle 170 (e.g., a converging/diverging nozzle) of the bypass airflow passage 142 to produce propulsive thrust.

Figure 2:
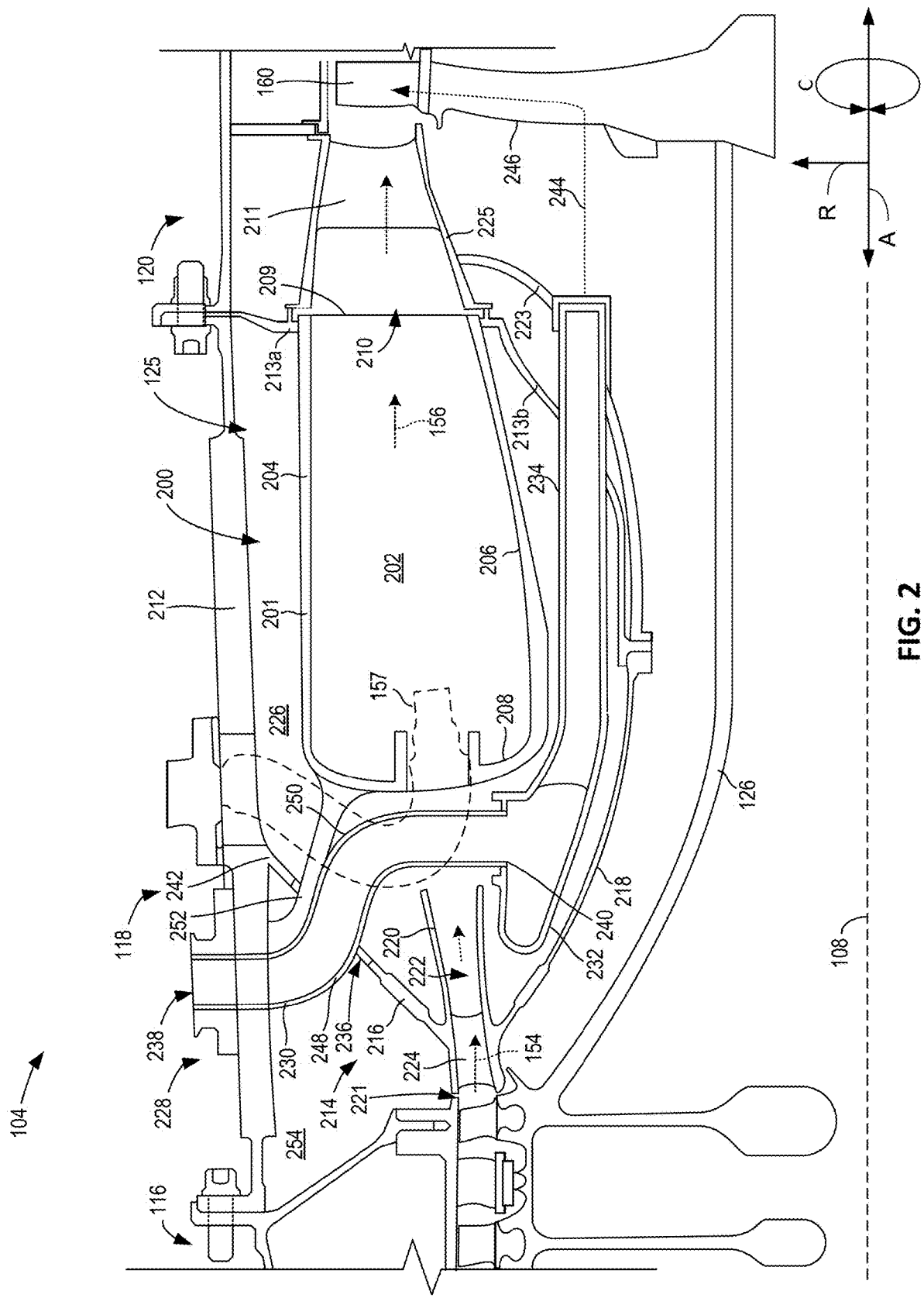
FIG. 2 is an enlarged cross-sectional view of a portion of an example combustion section of the example gas turbine engine of FIG. 1 and showing an example inner structure assembly of the example combustion section.

FIG. 2 is an enlarged cross-sectional view of a portion of the combustion section 118 of the gas turbine engine 104 of FIG. 1. The combustion section 118 is disposed between the outlet of the HP compressor 116 and the inlet of the HP turbine 120. In the illustrated example, the combustion section 118 includes an annular type combustor assembly 200 including a combustor 201 that defines a combustion chamber 202 wherein air and fuel are mixed and ignited. In the illustrated example, the combustor 201 includes an annular outer liner 204, an annular inner liner 206, and a bulkhead 208. The bulkhead 208 extends radially between the forward ends of the outer liner 204 and the inner liner 206. As shown in FIG. 2, the inner liner 206 is radially spaced from the outer liner 204 with respect to the centerline axis 108 and defines the combustion chamber 202 therebetween. In some examples, the outer liner 204 and/or the inner liner 206 may be at least partially or entirely formed from materials capable of withstanding high temperatures, such as metal alloys or ceramic matrix composite (CMC) materials. As disclosed above, the combustion section 118 includes a plurality of fuel nozzles 157 (one of which is reference in FIG. 2 and shown in dashed lines). The fuel nozzles 157 extend at least partially through the bulkhead 208 and provide a fuel-air mixture to the combustion chamber 202. A downstream end or outlet 209 of the combustor 201 is aligned, axially and radially, with an inlet 210 of the HP turbine 120. A sealing mechanism (e.g., a leaf seal), which includes an outer seal member 213a and an inner seal member 213b, is disposed between the outlet 209 and the inlet 210 to reduce or limit air leakage between the combustor 201 and the HP turbine 120. In the illustrated example, the inlet 210 includes a first set of stator vanes 211 (sometimes referred to as the stage one nozzle of the HP turbine 120). As such, hot combustion gases generated in the combustion chamber 202 flow into and through the first set of stator vanes 211.

As shown in FIG. 2, the combustion section 118 includes an outer casing 212 that surrounds or encases the combustor 201. The outer casing 212 may be coupled to outer casings of the HP compressor 116 and the HP turbine 120 upstream and downstream of the combustion section 118. The outer casings define, at least in part, the outer casing 110 (FIG. 1) of the gas turbine engine 104.

In the illustrated example, the combustion section 118 includes an inner structure assembly 214, which is sometimes referred to as an inner casing, a diffuser assembly, an outlet guide vane (OGV) assembly, or a diffuser/OGV assembly. The inner structure assembly 214 is coupled to and disposed radially inward of the outer casing 212. In the illustrated example, the inner structure assembly 214 includes an outer radial support arm 216, an inner radial support arm 218, and a diffuser 220 and outlet guide vanes (OGVs) 224 coupled between the outer radial support arm 216 and the inner radial support arm 218. The outer and inner radial support arms 216, 218 may also be referred to as walls or mounting structures. The outer radial support arm 216 extends between and is coupled to the outer casing 212 and the diffuser/OGVs 220, 224. The inner radial support arm 218 extends between and is coupled to the diffuser/OGVs 220, 224 and an inner nozzle support 223 that is coupled to an inner band 225 of the first set of stator vanes 211 (the stage one nozzle of the HP turbine 120). The inner nozzle support 223 provides a structural mounting location for the stage one nozzle. As shown in FIG. 2, the outer casing 212, the inner structure assembly 214, and the inner nozzle support 223 define a cavity 226 around the combustor 201. The outer and inner radial support arms 216, 218 position the diffuser 220 and OGVs 224 in alignment with an outlet 221 of the HP compressor 116. Further, the outer and inner radial support arms 216, 218 structurally support and transfer loads from the OGVs 224 and the diffuser 220 as well as loads from the stage one nozzle that are transmitted via an inner nozzle support 223. In the illustrated example, the diffuser 220 defines a diffuser passage 222 (e.g., between upper and lower diffuser arms). In this example, the OGVs 224 and the diffuser 220 are integrated as single part or component. However, in other examples, the OGVs 224 can be a separate part or component from the diffuser 220.

During operation of the gas turbine engine 104, the compressed air 154 (shown by dotted arrows) flows from the HP compressor 116, through the outlet guide vanes 224 and the diffuser 220, and into the cavity 226 of the combustion section 118. The outlet guide vanes 224 and the diffuser 220 condition the flow of the compressed air 154. In particular, the outlet guide vanes 224 act to straighten the airflow to some degree (e.g., reduce tangential/swirl component of the flow), prior to diffusion. Then, diffusion of the airflow in the diffuser passage 222 reduces the Mach number of the flow and increases static pressure, which creates optimal aerodynamic inlet conditions for the combustor 201. At least a portion of the compressed air 154 in the cavity 226 enters the fuel nozzle 157 and is mixed with fuel in the combustion chamber 202 of the combustor 201. The air-fuel mixture is ignited in the combustion chamber 202 to produce the combustion gases 156 (shown by dotted arrows). The combustion gases 156 generated in the combustion chamber 202 flow from the combustor assembly 200 and into the HP turbine 120, which causes the HP turbine rotor blades 160 to rotate, and which rotates or drives the HP shaft 126. The combustion gases 156 are then routed through the LP turbine 122 (FIG. 1). In some examples, a portion of the compressed air 154 in the cavity 226 flows around or outside of the outer and inner liners 204, 206 and is used to help cool the outer and inner liners 204, 206.

As described above, the inner structure assembly 214 includes the outer radial support arm 216, the inner radial support arm 218, the diffuser 220, and the OGVs 224. In some examples, the inner structure assembly 214 is constructed as a single unitary part or component (e.g., a monolithic structure), but in other examples can be constructed as one or more parts or components that are coupled (e.g., welded, fastened) together. The inner radial support arm 218 is coupled to and extends between the diffuser/OGVs 220, 224 and the inner nozzle support 223. The inner radial support arm 218 also coupled to the inner seal member 213b. For example, the inner radial support arm 218 may be coupled to the inner seal member 213b and the inner nozzle support 223 by a bolt. The outer radial support arm 216 is coupled to and extends between the diffuser/OGVs 220, 224 and the outer casing 212. In some examples, the outer radial support arm 216 is constructed (e.g., machined, molded) as a single unitary part of component with the outer casing 212, but in other examples can be constructed as a separate part that is coupled (e.g., welded, fastened, etc.) to the outer casing 212.

In the illustrated example, the outer radial support arm 216 extends at least partially in an axially downstream or aft direction (e.g., to the right in FIG. 2) from the diffuser/OGVs 220, 224 toward the outer casing 212. Further, the inner radial support arm 218 extends at least partially in the axially downstream direction from the diffuser/OGVs 220, 224. This configuration of the outer radial support arm 216 and the extends between and is coupled inner radial support arm 218 relative to the diffuser/OGVs 220, 224 is referred to as a swept cone shape configuration. A swept cone shape configuration is advantageous, compared to straight-line configurations, because the swept cone shape better handles axial displacements from thermal expansion due to the opposition direction of motion between the outer and inner radial support arms 216, 218. Therefore, this shape helps to reduce (e.g., minimize) axial displacements of the inner nozzle support 223, which results in less motion of the first set of stator vanes 211 (the stage one nozzle) and, thus, reduces gaps from opening between the outer and inner liners 204, 206 of the combustor 201 and the inlet 210 of the stage one nozzle. Further, this swept cone shape has a lower axial length compared to known straight-line inner casings and therefore enables a shorter or more compact engine. Further, the outer radial support arm 216 includes a plurality of openings, discussed in further detail herein, to enable one or more hardware components to extend radially into the combustion section 118 without requiring additional axial space for the components.

In the illustrated example, the gas turbine engine 104 includes a cooled cooling air (CCA) system 228 that provides cooling air to various areas or components of the gas turbine engine 104. The CCA system 228 conditions (e.g., cools) the air outside of the flow path 125 of the gas turbine engine 104, and includes a network of pipes or conduits to route the cooled air into or through the flow path 125 to reach one or more components in the gas turbine engine 104. For example, in the illustrated example, the CCA system 228 includes a plurality of CCA pipes 230, one of which is referenced in FIG. 2. The CCA system 228 includes a manifold 232 in the cavity 226. The manifold 232 extends annularly or circumferentially around the centerline axis 108. The CCA pipes 230 are fluidly coupled to and provide cooling air to the manifold 232. The CCA system 228 includes a plurality of axial tubes 234 (one of which is referenced in FIG. 2) that are fluidly coupled to the manifold 232. The axial tubes 234 direct the cooling air from the manifold 232 to one or more downstream components or areas of the gas turbine engine 104.

To enable the CCA pipes 230 to pass into the cavity 226, the outer radial support arm 216 of the inner structure assembly 214 defines a plurality of openings 236 therethrough, one of which is referenced in FIG. 2. The openings 236 may also be referred to as windows. The openings 236 are distributed circumferentially around the outer radial support arm 216, shown in further detail in FIGS. 4 and 5. As shown in FIG. 2, the CCA pipe 230 extends through the opening 236 and into the cavity 226. While only one CCA pipe 230 is shown and described in connection with FIG. 2, it is understood that the description can likewise apply to the other CCA pipes. The CCA pipe 230 has an inlet end 238 that is fluidly coupled to the outer casing 212 and an outlet end 240 that is fluidly coupled to the manifold 232. The inlet end 238 is located axially upstream or forward of a connection point or joint 242 between the outer radial support arm 216 and the outer casing 212. The outlet end 240 of the CCA pipe 230 is located in the cavity 226 and fluidly coupled to the manifold 232. Cooling air flows through the CCA pipe 230 from the inlet end 238 to the outlet end 240 and into the manifold 232. The cooling air fills the manifold 232 and then flows through the axial tube 234 and, directly or indirectly, to one or more downstream components or areas for cooling. For example, as shown by the dotted air flow line 244, at least some of the air is routed (e.g., via a network of pipes, hoses, channels, etc.) through a blade disk 246 and into internal passages in the stage one HP turbine rotor blades 160 for cooling the HP turbine rotor blades 160.

This example configuration of the swept cone shape configuration with the openings enables the inner structure assembly 214 to be positioned relatively close to the combustor assembly 200, which reduces axial length, while still enabling the CCA pipe 230 to extend into the cavity 226 and provide cooling air to the manifold 232. As can be appreciated from FIG. 2, a first portion of the CCA pipe 230 is upstream of the outer radial support arm 216 and a second portion of the CCA pipe 230 is downstream of the outer radial support arm 216. In some examples, the CCA pipe 230 has one or more bends that enable the CCA pipe 230 to be routed through the outer radial support arm 216. For example, as shown in FIG. 2, the CCA pipe 230 has a first bend 248 and a second bend 250. The first bend 248 is upstream of the outer radial support arm 216, and the second bend 250 is downstream of the outer radial support arm 216. As such, the CCA pipe 230 has an S-shaped profile. In other examples, the CCA pipe 230 may have more or fewer bends and/or otherwise be shaped differently.

The example openings 236 also enable the use of forward mounting arms on the combustor assembly 200. For example, as shown in FIG. 2, the combustor assembly 200 includes a plurality of forward mounting arms 252, one of which is referenced in FIG. 2. The forward mounting arms 252 extend forward or upstream from the combustor 201. In particular, the forward mounting arms 252 are coupled to and extend between a forward portion (e.g., the bulkhead 208) of the combustor 201 and the outer casing 212. The forward mounting arms 252 extend through respective ones of the openings 236. Use of the forward mounting arms 252 helps to control relative displacement between the fuel nozzles 157 and the combustor swirler components, which improves combustion operability, emissions, and other combustion characteristics needed for overall engine performance. In FIG. 2, the fuel nozzle 157 is shown in dashed lines to represent the fuel nozzle 157 is circumferentially offset from the CCA pipe 230 and the forward mounting arms 252. The forward mounting arms 252 also enable the use of non-metallic components in the combustor 201 such as ceramic matrix composite liners and bulkhead. Therefore, the example openings 236 enable the use of forward mounting arms 252 for the above-noted benefits.

Figure 3:
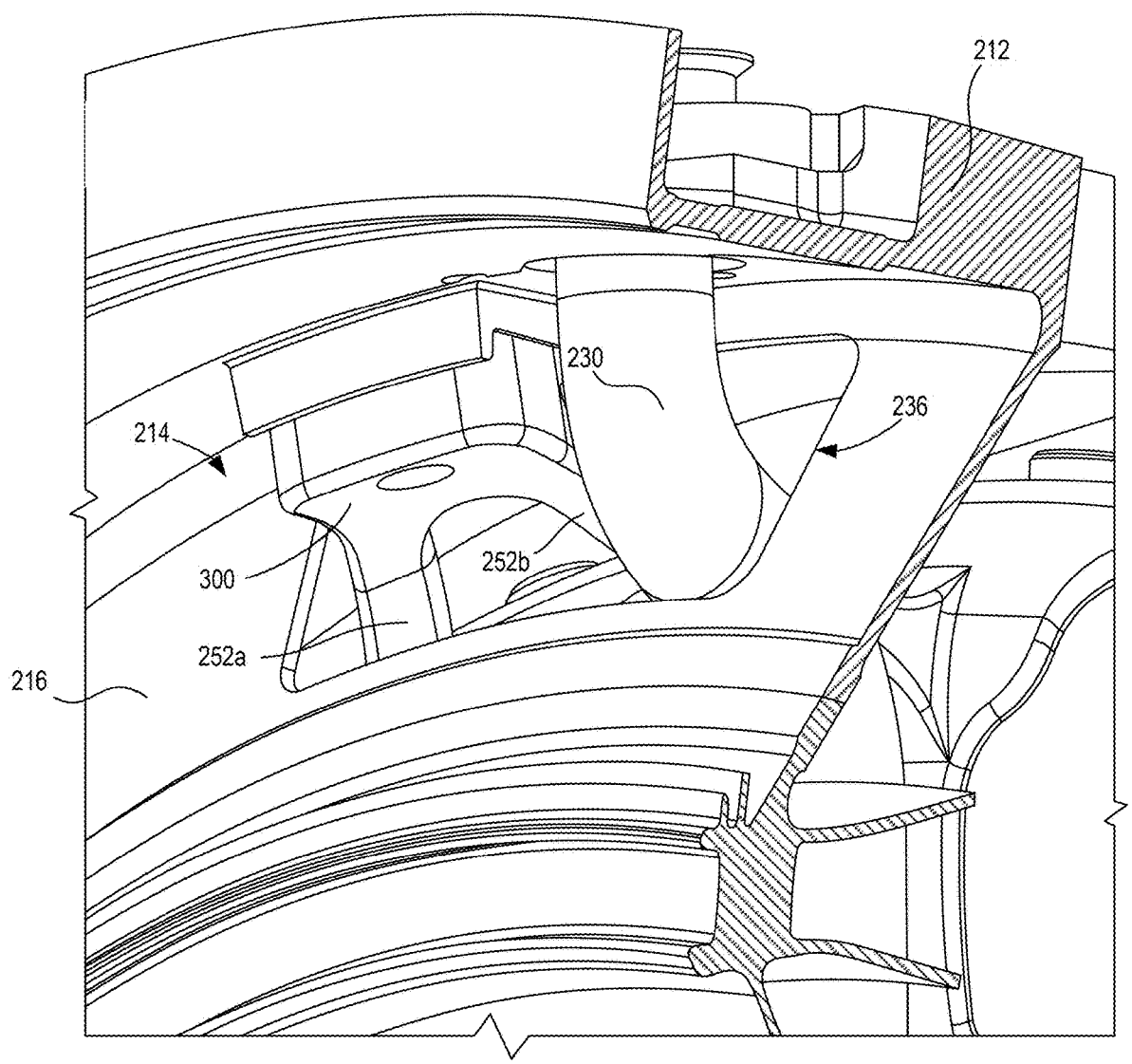
FIG. 3 is a perspective view of the example inner structure assembly of FIG. 2 showing an example cooled cooling air (CCA) pipe and an example forward mounting arm extending through an example opening in the example inner structure assembly.

FIG. 3 is a perspective cross-sectioned view of a portion of the outer casing 212 and the inner structure assembly 214. FIG. 3 shows one of the CCA pipes 230 extending through one of the openings 236 in the outer radial support arm 216. Also, in this example, two forward mounting arms 252a, 252b extend through the same opening 236 as the CCA pipe 230. In the illustrated example, the two forward mounting arms 252a, 252b are coupled (e.g., integrally formed) at a joint 300 that is coupled to an inner surface of the outer casing 212. In some examples, the joint 300 is coupled to the outer casing 212 via a fastener, such as a bolt or rivet. In other examples, the joint 300 can be coupled to the outer casing 212 via other fastening techniques (e.g., welding). In some examples, this V-shaped configuration of the forward mounting arms 252a, 252b helps to improve hoop stiffness. The other openings 236 of the outer radial support arm 216 may similarly accommodate one CCA pipe and two forward mounting arms. However, in other examples, any number of CCA pipes and/or forward mounting arms can be installed through each of the openings 236. For example, each of the openings 236 can have one CCA pipe, two CCA pipes, three CCA pipes, etc. and/or one forward mounting arm, two forward mounting arms, three forward mounting arms, etc.

Figure 4:
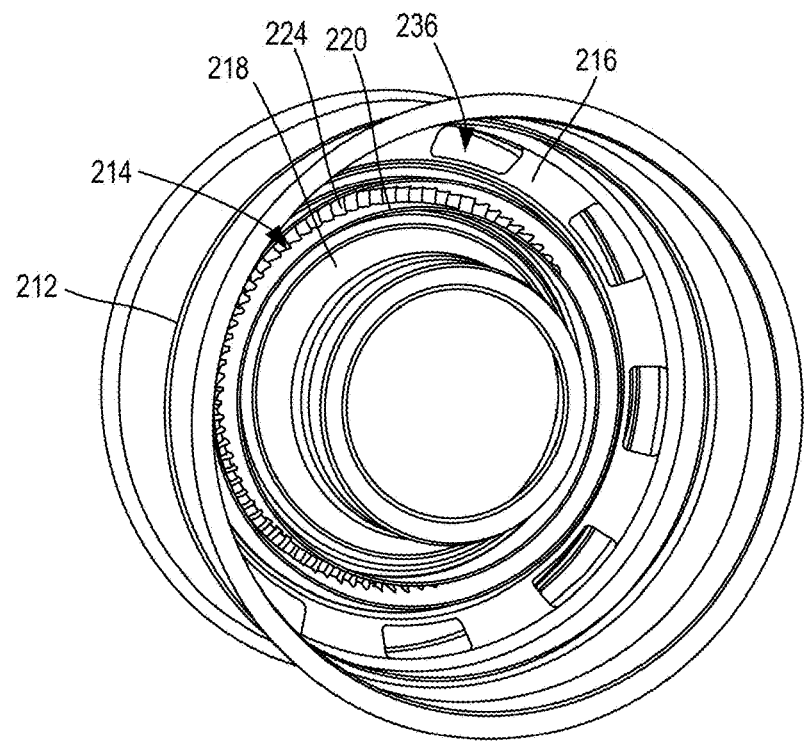
FIG. 4 is a perspective view of an example outer casing and the example inner structure assembly of FIG. 2.
Figure 5:
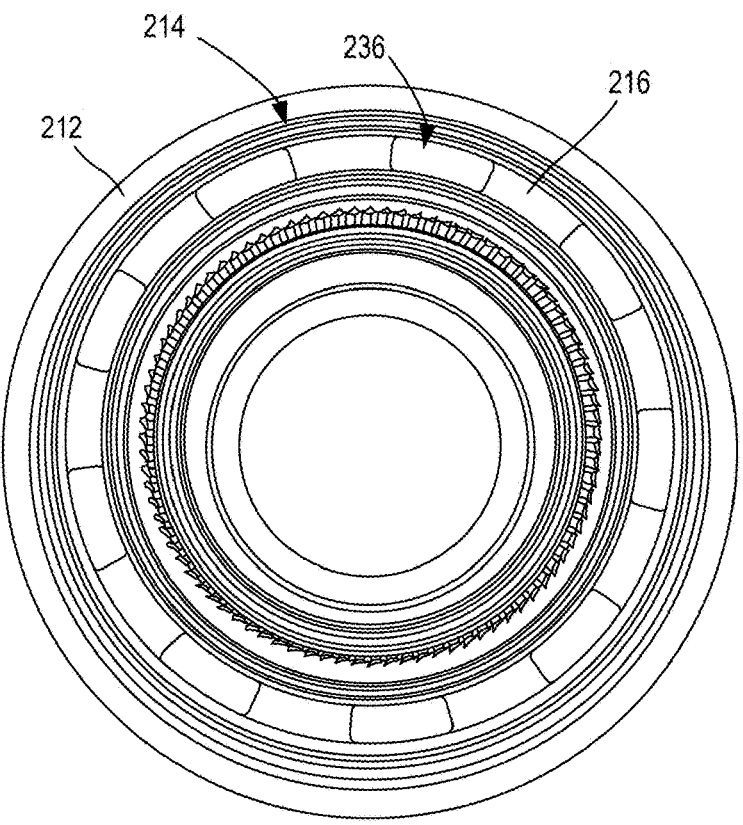
FIG. 5 is an axial end view of the example outer casing and the example inner structure assembly of FIG. 4.

FIG. 4 is a perspective view of the outer casing 212 and the inner structure assembly 214, including the outer radial support arm 216, the inner radial support arm 218, the diffuser 220, and the OGVs 224. FIG. 5 is an end view (in the axial direction) of the outer casing 212 and the inner structure assembly 214. FIGS. 4 and 5 show the openings 236 (one of which is labeled in each of FIGS. 4 and 5) formed or defined in the outer radial support arm 216. In the illustrated example, the outer radial support arm 216 has nine openings 236, and the openings 236 are spaced equidistant from each other in the circumferential direction. In some examples, the number and circumferential spacing of the openings 236 matches the number and circumferential spacing of the CCA pipes 230 (FIG. 2). For instance, the CCA system 228 (FIG. 2) may include nine CCA pipes that are spaced equidistant from each other in the circumferential direction. Further, in some examples, one or more forward mounting arms 252 (FIGS. 2 and 3) extend through each of the openings 236. Each of the CCA pipes 230 extends through a respective one of the openings 236. In other examples, the outer radial support arm 216 may include more or fewer openings 236 and/or the openings 236 may be spaced differently. For example, the outer radial support arm 216 may include one opening, two openings, three openings, etc.

As shown in FIGS. 3, 4, and 5, the openings 236 are rectangular shaped. In some examples, the CCA pipes 230 (FIG. 2) are cylindrical and, thus, have circular cross-sectional area. Therefore, a gap may exist between the outer surface of the CCA pipe 230 and the inner surface of the opening 236. In other words, the opening 236 is not fluidly sealed. This allows some air flow through the opening 236 to an area 254 (FIG. 4) upstream of the outer radial support arm 216. In some examples, the air in this area 254 is fed into one or more heat exchanges that create cooled cooling air (CCA), which is then supplied to the CCA pipes 230 of the CCA system 228. Additionally or alternatively, the air in the area 254 can be extracted as bleed air and used for various other purposes. However, in other examples, a seal may be disposed between the outer surface of the CCA pipe 230 and the inner surface of the opening 236 to block airflow. In some examples, the rectangular shape provides a balance of weight, clearance (opening size), and stiffness. However, in other examples the openings 236 can have different shapes, such as circular, oval, square, triangular, etc. In some examples, the openings 236 can be shaped to substantially match the shape of the CCA pipes 230.

As disclosed above, the example openings 236 enable one or more hardware components to be installed through the outer radial support arm 216. For example, CCA pipes and/or forward mounting arms can be installed through the opening 236. Additionally or alternatively, other types of hardware components (e.g., other types of pipes, pressure instrumentation, sensors, borescopes, strain gages, electrical lines, etc.) can be installed through the openings 236.

From the foregoing, it will be appreciated that the example swept cone configuration inner structure assembly results in lower axial displacement at the stage one nozzle leaf seal interface by striking a balance between the thermal and mechanical deflections, which act in opposite directions. Further, the openings in the outer radial support arm of the inner structure assembly enable forward cavity accessibility, which enables assembly of the combustor and other hardware. This enable compact packaging of the hardware (e.g., CCA pipes, forward mounting arms, etc.) without increasing the axial length of the engine. Moreover, the openings reduce overall weight of the inner structure assembly. The example inner structure assembly disclosed herein also achieves aerodynamic benefits by reducing the flow disturbance created inside the combustor by heat exchanger bleeds and, therefore, reduces or eliminates the need for additional manifolds or baffles. For example, one or more bleed ports may be located on the outer casing just upstream of the outer radial support arm. This helps to hide the ports behind paddles of the outer radial support arm so that it creates a more uniform flow to the bleed ports.

Further examples and example combinations thereof are provided by the subject matter of the following clauses:

A gas turbine engine including a compressor section, a combustion section, and a turbine section in a serial flow arrangement, the combustion section including: an outer casing; and an inner structure assembly coupled to the outer casing, the inner structure assembly including: an outer radial support arm; an inner radial support arm; and a diffuser coupled between the outer radial support arm and the inner radial support arm, wherein the outer radial support arm extends at least partially in an axially downstream direction from the diffuser, wherein the inner radial support arm extends at least partially in the axially downstream direction from the diffuser, and wherein the outer radial support arm defines an opening therethrough.

The gas turbine engine of any preceding clause, further including a cooled cooling air (CCA) system, the CCA system includes a CCA pipe extending through the opening in the outer radial support arm.

The gas turbine engine of any preceding clause, wherein the CCA pipe has an inlet end fluidly coupled to the outer casing, wherein the inlet end is located axially upstream of a joint between the outer radial support arm and the outer casing.

The gas turbine engine of any preceding clause, wherein the opening is one of a plurality of openings formed in the outer radial support arm, wherein the CCA pipe is one of a plurality of CCA pipes, and wherein each of the plurality of CCA pipes extends through a respective one of the plurality of openings.

The gas turbine engine of any preceding clause, wherein the opening is rectangular shaped.

The gas turbine engine of any preceding clause, wherein the CCA pipe is cylindrical.

The gas turbine engine of any preceding clause, wherein the outer casing and the inner structure assembly define a cavity, wherein the CCA system includes a manifold in the cavity, and wherein the CCA pipe has an inlet end fluidly coupled to the outer casing and an outlet end fluidly coupled to the manifold.

The gas turbine engine of any preceding clause, wherein the CCA system includes an axial tube fluidly coupled to the manifold to direct cooling air to one or more components of the gas turbine engine.

The gas turbine engine of any preceding clause, wherein a first portion of the CCA pipe is upstream of the outer radial support arm and a second portion of the CCA pipe is downstream of the outer radial support arm.

The gas turbine engine of any preceding clause, wherein the CCA pipe has one or more bends.

The gas turbine engine of any preceding clause, wherein the CCA pipe has a first bend upstream of the outer radial support arm and a second bend downstream of the outer radial support arm.

The gas turbine engine of any preceding clause, wherein the combustion section includes a combustor defining a combustion chamber.

The gas turbine engine of any preceding clause, wherein the combustion section includes a forward mounting arm coupled to and extending between a forward portion of the combustor and the outer casing.

The gas turbine engine of any preceding clause, wherein the forward mounting arm extends through the opening in the outer radial support arm.

The gas turbine engine of any preceding clause, further including a cooled cooling air (CCA) pipe extending through the opening.

The gas turbine engine of any preceding clause, wherein the forward mounting arm is a first forward mounting arm, the combustion section including a second forward mounting arm extending through the opening.

The gas turbine engine of any preceding clause, wherein the first and second forward mounting arms are coupled at a joint to an inner surface of the outer casing.

The gas turbine engine of any preceding clause, wherein the joint is coupled to the inner surface of the outer casing by a fastener.

The gas turbine engine of any preceding clause, wherein the opening is one of a plurality of openings formed in the outer radial support arm, wherein the forward mounting arm is one of a plurality of forward mounting arms, and wherein one or more forward mounting arms extend through each of the plurality of openings.

The gas turbine engine of any preceding clause, wherein the inner structure assembly includes outlet guide vanes in the diffuser.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A gas turbine engine, comprising:
a compressor section, a combustion section, and a turbine section in a serial flow arrangement, the combustion section including:
an outer casing;
a combustor defining a combustion chamber;
a forward mounting arm coupled to and extending between a forward portion of the combustor and the outer casing; and
an inner structure assembly coupled to the outer casing, the inner structure assembly including:
an outer radial support arm;
an inner radial support arm; and
a diffuser coupled between the outer radial support arm and the inner radial support arm, wherein the outer radial support arm extends at least partially in an axially downstream direction from the diffuser, wherein the inner radial support arm extends at least partially in the axially downstream direction from the diffuser, and wherein the outer radial support arm defines an opening therethrough, wherein the forward mounting arm extends through the opening; and
a cooled cooling air (CCA) pipe extending through the opening.

2. The gas turbine engine of claim 1, further including a cooled cooling air (CCA) system, the CCA system includes the CCA pipe extending through the opening in the outer radial support arm.

3. The gas turbine engine of claim 2, wherein the CCA pipe has an inlet end fluidly coupled to the outer casing, wherein the inlet end is located axially upstream of a joint between the outer radial support arm and the outer casing.

4. The gas turbine engine of claim 2, wherein the opening is one of a plurality of openings formed in the outer radial support arm, wherein the CCA pipe is one of a plurality of CCA pipes, and wherein each of the plurality of CCA pipes extends through a respective one of the openings.

5. The gas turbine engine of claim 2, wherein the opening is rectangular shaped.

6. The gas turbine engine of claim 5, wherein the CCA pipe is cylindrical.

7. The gas turbine engine of claim 2, wherein the outer casing and the inner structure assembly define a cavity, wherein the CCA system includes a manifold in the cavity, and wherein the CCA pipe has an inlet end fluidly coupled to the outer casing and an outlet end fluidly coupled to the manifold.

8. The gas turbine engine of claim 7, wherein the CCA system includes an axial tube fluidly coupled to the manifold to direct cooling air to one or more components of the gas turbine engine.

9. The gas turbine engine of claim 2, wherein a first portion of the CCA pipe is upstream of the outer radial support arm and a second portion of the CCA pipe is downstream of the outer radial support arm.

10. The gas turbine engine of claim 2, wherein the CCA pipe has one or more bends.

11. The gas turbine engine of claim 2, wherein the CCA pipe has a first bend upstream of the outer radial support arm and a second bend downstream of the outer radial support arm.

12. The gas turbine engine of claim 1, wherein the forward mounting arm is a first forward mounting arm, the combustion section including a second forward mounting arm extending through the opening.

13. The gas turbine engine of claim 12, wherein the first and second forward mounting arms are coupled at a joint to an inner surface of the outer casing.

14. The gas turbine engine of claim 13, wherein the joint is coupled to the inner surface of the outer casing by a fastener.

15. The gas turbine engine of claim 1, wherein the opening is one of a plurality of openings formed in the outer radial support arm, wherein the forward mounting arm is one of a plurality of forward mounting arms, and wherein one or more forward mounting arms extend through each of the plurality of openings.

16. The gas turbine engine of claim 1, wherein the inner structure assembly includes outlet guide vanes in the diffuser.

* * * * *